(12) United States Patent
Zhou et al.

(10) Patent No.: US 9,989,696 B2
(45) Date of Patent: Jun. 5, 2018

(54) HIGH COLOR GAMUT BACKLIGHT MODULE AND DISPLAY DEVICE

(71) Applicant: Wuhan China Star Optoelectronics Technology Co., Ltd., Wuhan, Hubei (CN)

(72) Inventors: Gege Zhou, Hubei (CN); Shihhsiang Chen, Hubei (TW)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 287 days.

(21) Appl. No.: 14/768,370

(22) PCT Filed: Jun. 11, 2015

(86) PCT No.: PCT/CN2015/081258
§ 371 (c)(1),
(2) Date: Aug. 17, 2015

(87) PCT Pub. No.: WO2016/197368
PCT Pub. Date: Dec. 15, 2016

(65) Prior Publication Data
US 2017/0146724 A1    May 25, 2017

(30) Foreign Application Priority Data

Jun. 8, 2015 (CN) .......................... 2015 1 0310111

(51) Int. Cl.
*G02B 6/00* (2006.01)
*F21V 8/00* (2006.01)

(52) U.S. Cl.
CPC .......... *G02B 6/0088* (2013.01); *G02B 6/005* (2013.01); *G02B 6/0055* (2013.01)

(58) Field of Classification Search
CPC .... G02B 6/0035; G02B 6/005; G02B 6/0053; G02B 6/0088
See application file for complete search history.

(56) References Cited

U.S. PATENT DOCUMENTS 6,637,905 B1 * 10/2003 Ng ........................ G02B 6/0026
                                                    362/601
7,891,852 B2 *  2/2011 Pugh .................... G02B 6/0023
                                                    362/606
(Continued)

FOREIGN PATENT DOCUMENTS

CN        2819251      9/2006
CN      202511145     10/2012
(Continued)

OTHER PUBLICATIONS

International Search Report for PCT/CN2015/081258, Completed by the Chinese Patent Office dated Feb. 23, 2016, 11 Pages.

*Primary Examiner* — Julie Bannan
(74) *Attorney, Agent, or Firm* — Mintz Levin Cohn Ferris Glovsky and Popeo, P.C.; Kongsik Kim

(57) ABSTRACT

A high color gamut backlight module including a non-opaque first plastic frame, a light guide plate, an optical membrane set and a quantum membrane; the optical membrane set and the quantum membrane are stacked, from top to bottom, on the light guide plate; an inner side surface and a top surface of the first plastic frame are provided opposite to one end surface of the light guide plate and a lower surface of the quantum membrane, respectively; a top surface of the first plastic frame is a yellow fluorescent layer.

18 Claims, 1 Drawing Sheet

(56) References Cited

U.S. PATENT DOCUMENTS

| | | | |
|---|---|---|---|
| 2008/0019147 A1 | 1/2008 | Erchak et al. | |
| 2010/0283072 A1* | 11/2010 | Kazlas | G02B 6/005 257/98 |
| 2013/0242226 A1* | 9/2013 | Jeong | G06F 1/1637 349/58 |
| 2015/0117052 A1* | 4/2015 | Hsu | G02B 6/0043 362/606 |
| 2015/0160401 A1* | 6/2015 | Namekata | G02F 1/1336 349/65 |
| 2015/0185410 A1* | 7/2015 | Song | G02B 6/0091 349/65 |
| 2017/0059760 A1* | 3/2017 | You | G02B 6/0003 |

FOREIGN PATENT DOCUMENTS

| | | |
|---|---|---|
| CN | 103499054 | 1/2014 |
| CN | 103698937 | 4/2014 |
| CN | 103742833 | 4/2014 |
| CN | 203615170 | 5/2014 |
| CN | 203686775 | 7/2014 |
| CN | 104214608 | 12/2014 |
| CN | 104566015 | 4/2015 |
| CN | 204300782 | 4/2015 |

* cited by examiner

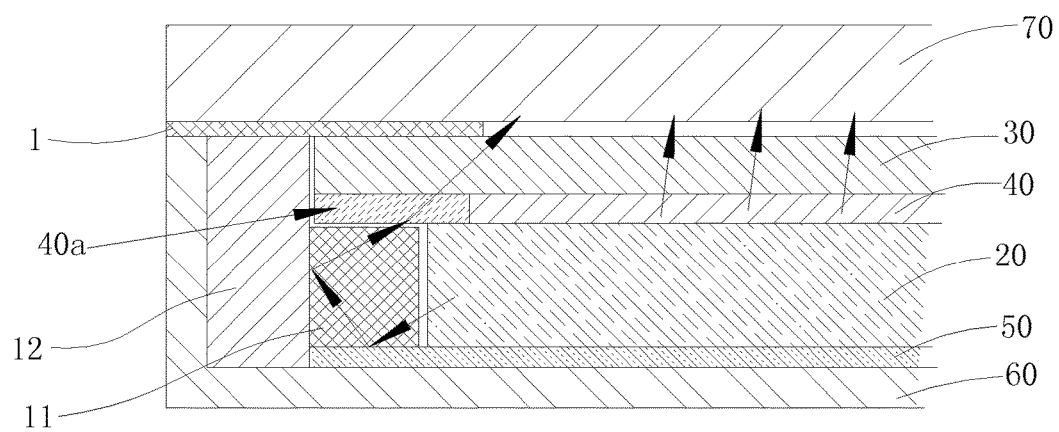

HIGH COLOR GAMUT BACKLIGHT MODULE AND DISPLAY DEVICE

CROSS-REFERENCE TO RELATED APPLICATION

This application is the U.S. national phase of PCT Application No. PCT/CN2015/081258 filed on Jun. 11, 2015, which claims priority to CN Patent Application No. 201510310111.7 filed on Jun. 8, 2015, the disclosures of which are incorporated in their entirety by reference herein.

BACKGROUND OF THE INVENTION

1. Field of the Invention

The present invention relates to a liquid crystal display technical field, and more particularly to a high color gamut backlight module and a display device.

2. The Related Arts

Nowadays, the liquid crystal display device, as a display unit of the electronic equipment, has been widely applied to various electronic products. With the increasing demand of the consumer on the color vividness/color definition, there is a need to increase the gamut value of the display device; the back light module, on the other hand, is an important unit in the liquid crystal display device, which, when being used as the light bar of the light source, must be in dire need of improving gamut.

In general, the backlight module includes: a light guide plate, the plastic frames provided around the light guide plate, a light source flexible circuit board and a light shielding tape; the light source flexible circuit board is fixed on the light guide plate and the plastic frames by the light shielding tape, an optical membrane is also fixed on the frames by the light shielding double-sided tape, and a liquid crystal display screen is fixed around the backlight module by the double-sided tape.

However, since the cutting edge of the high color gamut membrane has an invalid zone of a certain width, which may cause a difference between the color of the invalid zone and the color of the other area. As a result, the color gamut may become less uniform.

SUMMARY

Considering the defects existing in the prior art, an embodiment of the present invention provides a backlight module and a display device with smaller color difference and higher uniformity in color gamut.

In order to achieve the above purpose, the technical solution used by embodiments of the present invention is as follows:

a high color gamut backlight module including a first plastic frame which is non-opaque, a light guide plate, an optical membrane set and a quantum membrane the optical membrane set and the quantum membrane are stacked, from top to bottom, on the light guide plate; an inner side surface and a top surface of the first plastic frame are provided opposite to one end surface of the light guide plate and a lower surface of the quantum membrane, respectively; a top surface of the first plastic frame is a yellow fluorescent layer.

Wherein, the high color gamut backlight module further includes a reflection layer which is provided on the lower surface of the light guide plate.

Wherein, the high color gamut backlight module further includes a back plate which is provided on the lower surface of the light guide plate.

Wherein, the high color gamut backlight module further includes a second plastic frame, the second plastic frame being higher than a first plastic frame and in close contact with the outer surface of the first plastic frame.

Wherein the first plastic frame is a colloid filled with yellow fluorescent powder.

Or, the top surface of the first plastic frame is coated with yellow fluorescent powder.

Wherein, the first plastic frame and the second plastic frame are formed through bi-color injection molding.

Wherein, the outer wall of the first plastic frame adjacent to the second plastic frame is reflection layer.

Or, the inner surface of the second plastic frame is a reflection layer.

The present invention also provides a display device including a display panel and the above-mentioned backlight module, wherein the display panel is provided on the upper surface of the backlight module.

In the present invention, the quantum membrane is provided between the upper surface of the light guide plate and the optical membrane set, meanwhile, a side surface of the light guide plate is provided with the non-opaque first plastic frame; a top surface of the first plastic frame is provided with the yellow fluorescent layer; the blue light exiting from the side surface of the light guide plate is emitted from a top surface of the light guide plate; the yellow fluorescent layer is excited to generate a white light which passes through the invalid zone of the quantum membrane, while the light emitted from the top surface of the light guide plate is also a white light, thus the small color difference there-between may effectively solve the color different problem of the visible zone, hence the uniformity of color gamut of the backlight module is high.

BRIEF DESCRIPTION OF THE DRAWINGS

FIG. 1 is a structure diagram of a display device of an embodiment of the present invention.

DETAILED DESCRIPTION OF EXEMPLARY EMBODIMENTS

In order for a clearer purpose, technical solution and the advantage of the present invention, the present invention will be detailedly explained by referring to the FIGURE and using exemplary embodiments. In should be understood that the specific embodiment described herein is only used to explain but not to define the present invention.

As shown in FIG. 1, the present invention discloses a high color gamut backlight module including a first plastic frame 11, a light guide plate 20, an optical membrane set 30 and a quantum membrane 40; the optical membrane set 30 and the quantum membrane 40 are stacked from top to bottom on the light guide plate 20 in sequence; an inner side surface and a top surface of the first frame 11 are provided opposite to an end surface of the light guide plate 20 and a lower surface of the quantum membrane 40, respectively; a top surface of the quantum membrane 40 is a yellow fluorescent layer.

Further, a lower surface of the light guide plate 20 is provided with a reflection layer 50, and a back plate 60 is provided on the lower surface of the reflection layer 50.

A second plastic frame 12 is higher than the first plastic frame 11 and is in close contact with the outer surface of the first plastic frame 11. Here, the first plastic frame 11 is a colloid filled with yellow fluorescent powder, the second plastic frame 12 is made of resin material such as PC (polycarbonate) etc. The first plastic frame 11 and second plastic frame 12 are formed by bi-color injection molding.

In the other embodiment, one only needs to coat the yellow fluorescent powder on the top surface of the first frame 11, which may also achieve the effect of exciting the yellow fluorescent powder by using blue light to emit white light.

In the present embodiment, the outer wall of the first plastic frame 11 adjacent to the second plastic frame 12 is a reflection layer, or, the inner wall of the second plastic frame 12 adjacent to the first frame 11 is a reflection layer.

A portion of quantum membrane 40 opposite to the first frame 11 is the membrane invalid zone 40a, while the rest portion is the visible zone; since a layer of quantum membrane 40 is provided on the lower surface of the optical membrane set 30, the invalid zone 40 of the peripheral frames of the quantum membrane 40 is relatively large; due to the setting of the first frame 11, when the LED light source is lighted, the side surface of the light guide plate 20 emits blue light, the top surface of the light guide plate 20 emits white light; the light emitted from the side surface of the light guide plate 20 excites white light after passing through the bottom surface and the side surface inner wall of the first frame 11, and eventually exits from the top surface to the membrane invalid zone 40a; the white light emitted from the top surface of the light guide plate 20 exits to the visible zone, thus the color difference between said light and the white light emitted from the invalid zone 40a is relatively small, hence the uniformity of the color gamut of the backlight module becomes good.

The present invention also provides a display device including a display panel 70 and a backlight module, wherein the display panel 70 is provided on the upper surface of the optical membrane set of the backlight module. The light shielding tape 1 is adhered to the lower surface of the non-display zone of the display panel 70, and is adhered to the upper surface of the vertical portion of the back plate 60 and a part of the upper surface of the optical membrane set 30, thereby preventing the light pollution.

In the present invention, the quantum membrane is provided between the upper surface of the light guide plate and the optical membrane set, meanwhile, a side surface of the light guide plate is provided with the nonopaque first plastic frame; a top surface of the first plastic frame is provided with the yellow fluorescent layer; the blue light exiting from the side surface of the light guide plate is emitted from a top surface of the first plastic frame; the yellow fluorescent layer is excited to generate a white light which passes through the invalid zone of the quantum membrane, while the light emitted from the top surface of the light guide plate is also a white light, thus the small color difference there-between may effectively solve the color different problem of the visible zone, hence increasing the uniformity of color gamut of the backlight module.

The above statements are only the specific embodiments of the present application, it should be pointed out that, to those ordinary skilled in the art, several improvements and modification can be made without depart from the principle of the present application, also those improvements and modification should be considered as the protection scope of the present application.

What is claimed is:

1. A high color gamut backlight module, including: a first plastic frame which is nonopaque, a second plastic frame which is higher than a first plastic frame and in close contact with the outer surface of the first plastic frame, a light guide plate, an optical membrane set and a quantum membrane; the optical membrane set and the quantum membrane are stacked from top to bottom on the light guide plate in sequence; an inner side surface and a top surface of the first plastic frame are provided opposite to one end surface of the light guide plate and a lower surface of the quantum membrane respectively; a top surface of the first plastic frame is a yellow fluorescent layer.

2. The high color gamut backlight module of claim 1, further including a reflection layer which is provided on the lower surface of the light guide plate.

3. The high color gamut backlight module of claim 1, further including a back plate which is provided on the lower surface of the light guide plate.

4. The high color gamut backlight module of claim 1, wherein the first plastic frame is a colloid filled with yellow fluorescent powder.

5. The high color gamut backlight module of claim 1, wherein a top surface of the first plastic frame is coated with yellow fluorescent powder.

6. The high color gamut backlight module of claim 1, wherein the first plastic frame and the second plastic frame are formed through bi-color injection molding.

7. The high color gamut backlight module of claim 1, wherein an outer wall of the first plastic frame adjacent to the second plastic frame is a reflection layer.

8. The high color gamut backlight module of claim 1, wherein an inner surface of the second plastic frame is a reflection layer.

9. A display device including: a display panel and a backlight module, wherein the display panel is provided on the upper surface of the backlight module; the backlight module includes a first plastic frame which is nonopaque, a second plastic frame which is higher than the first plastic frame and in close contact with the outer surface of the first plastic frame, a light guide plate, an optical membrane set and a quantum membrane; the optical membrane set and the quantum membrane are stacked from top to bottom on the light guide plate in sequence; an inner side surface and a top surface of the first plastic frame are provided opposite to one end surface of the light guide plate and a lower surface of the quantum membrane, respectively; a top surface of the first plastic frame is a yellow fluorescent layer.

10. The display device of claim 9, wherein the backlight module further including a reflection layer which is provided on the lower surface of the light guide plate.

11. The display device of claim 9, wherein the backlight module further including a back plate which is provided on the lower surface of the light guide plate.

12. The display device of claim 9, wherein the first plastic frame is a colloid filled with yellow fluorescent powder.

13. The display device of claim 9, wherein a top surface of the first plastic frame is coated with yellow fluorescent powder.

14. The display device of claim 9, wherein the first plastic frame and the second plastic frame are formed through bi-color injection molding.

15. The display device of claim 9, wherein an outer wall of the first plastic frame adjacent to the second plastic frame is a reflection layer.

16. The display device of claim 9, wherein an inner surface of the second plastic frame is a reflection layer.

17. The display device of claim 10, wherein the first plastic frame is a colloid filled with yellow fluorescent powder.

18. The display device of claim 11, wherein the first plastic frame is a colloid filled with yellow fluorescent powder.

* * * * *